UNITED STATES PATENT OFFICE.

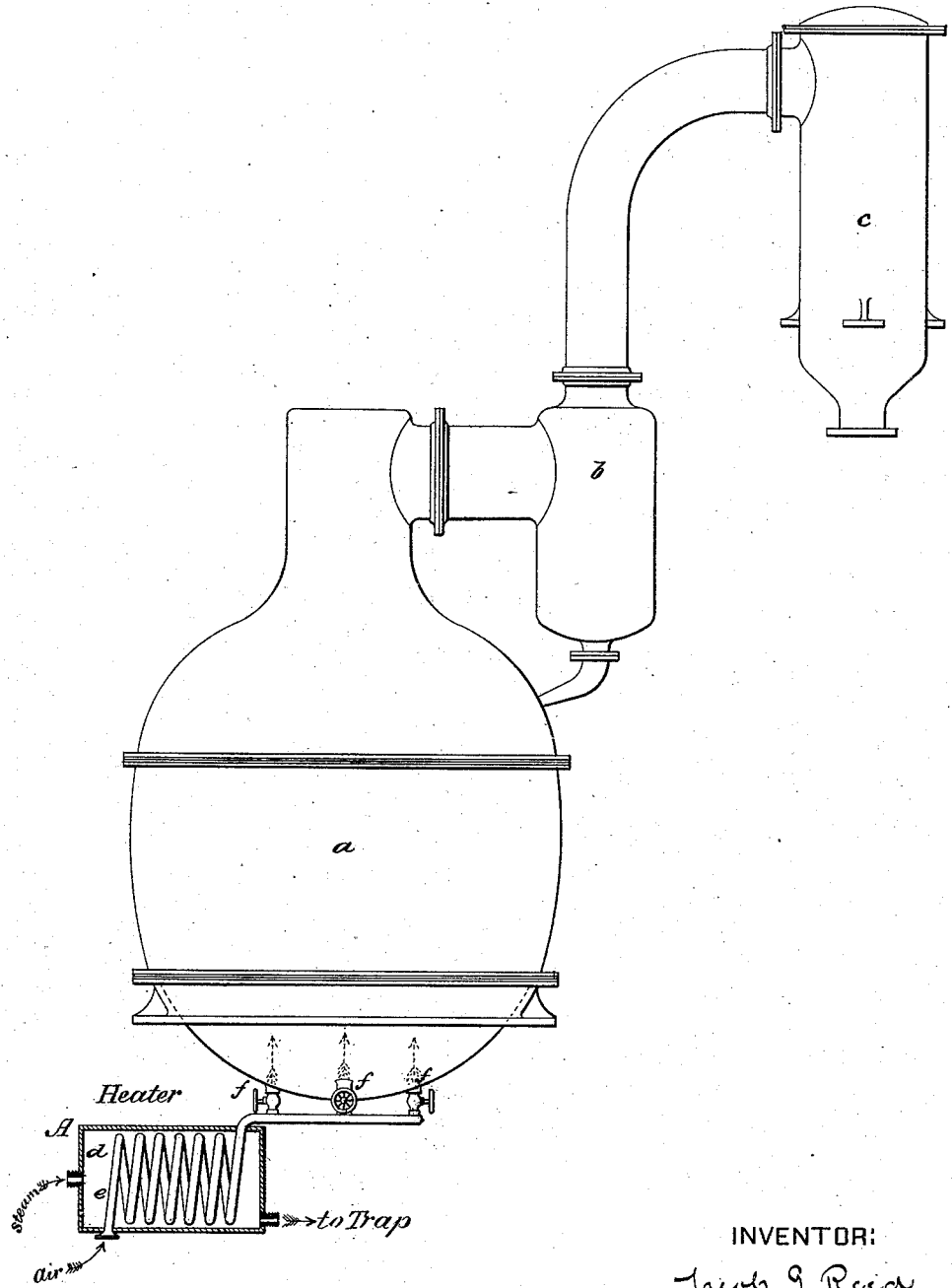

JACOB G. REED, OF NEW YORK, N. Y., ASSIGNOR OF ONE-HALF TO FREDERICK C. KNOWLES, OF SAME PLACE.

VACUUM-PAN.

SPECIFICATION forming part of Letters Patent No. 238,968, dated March 15, 1881.

Application filed November 12, 1880. (No model.)

*To all whom it may concern:*

Be it known that I, JACOB G. REED, of New York city, in the county and State of New York, have invented certain new and useful Improvements in Vacuum-Pans, of which the following is a specification.

In the concentration of certain liquors or extracts in vacuum-pans, where very dense or thick extracts are required—such, for instance, as in the case of dye-wood extracts—it is found that, owing to the low temperature that exists in the vacuum, it is impossible to remove sufficient of this moisture to secure the required concentration. Hence it is usual to destroy the vacuum at intervals by opening the valves and admitting air, and then allowing the mass to heat up to the temperature allowed by atmospheric pressure, after which the exhaustion is again effected, which insures an increased disengagement of the moisture from the mass, now heated much beyond the vacuum temperature, so that a more dense concentration is thus effected. As this system, however, requires repeated and alternate stages of heating and exhausting, its action is slow, and the repeated abrupt renewals of the vacuum are manifestly wasteful of power.

My improvement consists in certain means, as hereinafter set forth, whereby the vacuum or partial vacuum in the pan may be kept constant, or nearly so, while at the same time an influx of hot dry air is discharged in regulated jets up through the mass of fluid, whereby the moisture is absorbed or evaporated from all parts of the mass, and the mass kept at the same time in constant motion during said influx and exhaustion, which insures uniform liquidity and the reduction of the mass to the desired density in a constant, rapid, and economical manner.

The figure in the drawing represents an elevation of a vacuum-pan provided with my improvement.

*a* indicates the vacuum-pan proper, *b* the overflow-chamber thereof, and *c* the condenser, which is connected with the exhausting-pumps, the whole being constructed and operated in the usual manner, which it is not necessary to here fully illustrate.

*A* indicates an air-heater, which may be arranged at any suitable location, either close to or remote from the vacuum-pan, and may be of any suitable or adopted construction; but in the special case illustrated it consists of a case, *d*, through which, say, superheated steam is passed, and a coil, *e*, inclosed in said case, and through which air may be drawn, which air is heated by the external steam, as will be readily understood. One terminal of the coil opens into the atmosphere, and the opposite terminal extends to the vacuum-pan, and is branched into a series of two or more jets, *f*, which enter the base of the vacuum-pan at various radial distances or distributed positions, and terminate therein at or near the bottom of the chamber thereof, each jet or branch being provided with a suitable valve, as shown, whereby the discharge from any jet may be regulated as desired.

It may now be seen that when the complete apparatus is in operation, the pan being exhausted while steam is passed through the heater and the air-valves opened, jets of highly-heated air will be sucked into the vacuum-pan, which jets will rise in expanding bubbles through the liquid contents and be drawn off with the vapor by the exhaust. This inflowing air will hence not only keep the mass in constant agitation, and thus obviate the use of mechanical stirrers, heretofore necessary, but the bubbles of hot dry air expanding throughout the liquid mass absorb or evaporate the moisture thereof rapidly, and hence by this system the advantages of ebullition at low temperature, as exists in a vacuum, with the absorbing power of dry air for moisture, are combined, and the concentrating action of the vacuum-pan thereby greatly increased and the action rendered continuous and economical, no stoppages being necessary, as in the system heretofore used.

The air drawn through the heating-coil may, of course, be freed of its moisture before it enters the coil by chemical or dynamical means, so as to render it chemically dry; but it is thought that ordinary atmospheric air will be sufficiently dry for the purpose. The air is of course preferably heated up to such a temperature that after it expands in the vacuum-pan it shall still possess a much higher temperature than the boiling-point in the vacuum-pan, so as to possess great evaporating power on the moisture in the liquid contents thereof.

It may be observed that the air-valves of the several jets $f$ may be so regulated as to distribute the air properly to different parts of the contents of the pan, and to so regulate the inflow as to accomplish the required evaporation without the admission of any excess which would tend to undue foaming or put greater work than is necessary on the exhausting-pumps in maintaining a rarefied atmosphere in the pan.

Instead of employing superheated steam to heat the air-coils, the coils may, of course, be heated by direct fire, or by any other convenient source of heat. Instead of an ordinary coil, any other form of air-heating chamber may be used.

I do not wish to be understood as claiming, broadly, the mere idea of introducing jets of air through the contents of a vacuum-pan to increase evaporation while the same are being concentrated; but heretofore such jets have been introduced through hollow perforated stirring-arms, whereas in my improvement the air is introduced directly at the bottom of the pan through a series of jet-pipes or tuyeres disposed at different positions on the bottom of the pan. The jets thus introduced not only accelerate the evaporation of the moisture from the contents of the pan, but keep the same in constant agitation at numerous distributed points in the pan, thus not only dispensing with complicated stirring-arms, which are difficult to clean and likely to clog, but also saving the power required to work them. Thus in the former case not only is power used to revolve the arms in the thick liquid, but additional power is also required to force or suck the air through the liquid and thence exhaust it from the pan, whereas in my case the single action of exhaustion forces the air through the liquid and stirs it effectually at all points at the same time. Besides, the apparatus is much more simple, complete, and not likely to clog, or difficult to clean in case of clogging, while the chamber of the vacuum-pan is kept free from all mechanism.

What I claim is—

The combination, with a vacuum-pan, of a device for heating or drying air and a conduit extending therefrom to the base of the vacuum-pan, with a series of jets or tuyeres branching from said conduit and entering the base of the pan at distributed positions thereon, with means for regulating the inflow of air through said jets, substantially as and for the purpose herein set forth.

JAC. G. REED.

Witnesses:
 EDWARD H. WALES,
 CHAS. M. HIGGINS.